United States Patent [19]

Ishikawa et al.

[11] Patent Number: 5,822,227
[45] Date of Patent: Oct. 13, 1998

[54] AIR-CONDITIONING AND VENTILATION SIMULATOR IN SUBSURFACE SPACE

[75] Inventors: Touru Ishikawa, Zama; Nobuharu Morii, Mishima, both of Japan

[73] Assignee: Tokyo Metropolitan Subway Construction Corporation, Tokyo, Japan

[21] Appl. No.: 771,163

[22] Filed: Dec. 20, 1996

[51] Int. Cl.$^6$ .............................. G06F 17/00; F24F 7/00
[52] U.S. Cl. ......................................... 364/578; 236/49.3
[58] Field of Search .......................... 364/578; 434/126; 236/1 C, 49.3

[56] References Cited

U.S. PATENT DOCUMENTS

| | | | |
|---|---|---|---|
| 3,982,330 | 9/1976 | Saltsman et al. | 434/126 |
| 4,552,059 | 11/1985 | Potter | 98/115.1 |
| 4,591,093 | 5/1986 | Elliott, Jr. | 236/94 |
| 4,696,167 | 9/1987 | Matsui et al. | 62/180 |
| 5,042,470 | 8/1991 | Kanesaka | 128/202.22 |
| 5,226,818 | 7/1993 | Feiock et al. | 434/226 |
| 5,505,378 | 4/1996 | Park | 236/493 |
| 5,557,555 | 9/1996 | Friot et al. | 364/578 |
| 5,590,062 | 12/1996 | Nagamitsu et al. | 364/578 |

OTHER PUBLICATIONS

"Subway Environmental Simulation Program and Subway Environmental Design Handbook Validation Through Field Testing. Part 1: Underplatform Exhaust System and Train Borne Resister Grid Test Program", published by U.S. Department of Transportation, Feb. 1983.

*Primary Examiner*—Vincent N. Trans
*Attorney, Agent, or Firm*—Evenson, McKeown, Edwards & Lenahan, P.L.L.C.

[57] ABSTRACT

An air-conditioning and ventilation simulator for predicting environmental conditions in a subsurface space, which includes a first processing portion for obtaining the airflow velocity in branches constituting the subsurface space; a second processing portion for calculating initial values and short-term change values of wall temperature and field temperature in each of the branches, initial values and boundary values of temperature, water-vapor density and carbon dioxide concentration in each of the branches; a third processing portion for calculating the wall temperature, field temperature and airflow temperature in each of the branches; and a fourth processing portion for performing detailed calculation of the airflow velocity, temperature, humidity and carbon dioxide concentration for calculating time-varying data of the airflow temperature, water-vapor density and carbon dioxide concentration in each of the branches by using, as input data, the space structure model data, the airflow analysis result data obtained from the first processing portion, the thermal analysis result data obtained from the second processing portion, and wall and field temperature data obtained from the third processing portion.

11 Claims, 7 Drawing Sheets

AIR-CONDITIONING AND VENTILATION SIMULATOR IN SUBSURFACE SPACE

BACKGROUND OF THE INVENTION

1. Field of the Invention

The present invention relates to an air-conditioning and ventilation simulator in a subsurface space, and particularly to an air-conditioning and ventilation simulator for simulating environments such as wind, temperature, humidity, fine-dust concentration, carbon dioxide (hereinafter referred to as $CO_2$) concentration, etc. in a subsurface space such as a subway, a subsurface shopping area, etc. to thereby generate information for setting the equipmental capacity, or the like, of an air-conditioner with a refrigerating machine.

2. Description of the related Art

A subway environmental simulation program described, for example, in a report Subway Environmental Simulation Program and Subway Environmental Design Handbook Validation Through Field Testing. Part 1: Underplatform Exhaust System and Train Borne Resister Grid Test Program published by the U.S. Department of Transportation, February 1983, is known as a conventional technique concerning an air-conditioning and ventilation simulator in a subsurface space.

In this conventional technique which relates to an air-conditioning and ventilation simulator in a space containing a tunnel in a subway, airflows in a tunnel are regarded as one-dimensional incompressible airflows upon the assumption that the air flows in a tunnel at a uniform velocity in all places. Further, in this conventional technique, air drag received by a train in the case where the train runs in a tunnel is determined on the basis of the drag coefficient of the air and the sectional area of the train upon the assumption that the drag of the air is proportional to a square of the airflow velocity relative to a train regardless of the viscosity of airflows as a fluid. Further, the drag coefficient of the air is determined on the basis of the airflow velocity in a tunnel, the velocity of a train, the coefficient of frictional drag of a wall of the tunnel and the geometrical condition between the tunnel and the train.

In the case where the ratio of the sectional area of a train to the sectional area of a tunnel (hereinafter referred to as "blockage ratio") is higher than about 0.5, however, the effect of gas compressibility in the tunnel becomes remarkable so that the drag of the air is not proportional to a square of the airflow velocity relative to the train regardless of the viscosity of the fluid. Further, also in the case where the blockage ratio is low, the time-dependency of the drag coefficient of the air becomes remarkable so that the drag coefficient of the air cannot be regarded as a constant value if a train runs in a tunnel at a running pattern in which acceleration, high-velocity running and deceleration are repeated in a short distance.

As described above, because the air-conditioning and ventilation simulator according to the conventional technique requires geometrical conditions between a tunnel and a train, there arises a problem that a great deal of experiments are necessary for obtaining data in the conditions. Furthermore, because simulation is performed under the unreal condition in which the drag of the air has no relation to the viscosity of airflows as a fluid, there arises a problem that the state of the airflows in a subsurface space cannot be simulated accurately. Accordingly, when data obtained by the conventional technique are used, the equipmental capacity, or the like, of an air-conditioner cannot be set accurately.

SUMMARY OF THE INVENTION

An object of the present invention is to solve the aforementioned problems in the conventional technique to thereby provide an air-conditioning and ventilation simulator for simulating the state of the airflows accurately in a subsurface space so as to predict temperature, humidity, $CO_2$ concentration and fine-dust concentration accurately in the subsurface space.

In order to achieve the above object, according to an aspect of the present invention, the air-conditioning and ventilation simulator for predicting environmental conditions in a subsurface space, comprises: a first processing portion for obtaining the airflow velocity in branches including a tunnel, stairs, passages, vents, etc. constituting the subsurface space by using, as input data, subsurface space structure model data concerning the branches and movement data of a moving body which makes air move in the subsurface space; a second processing portion for calculating initial values and short-term change values of wall temperature and field temperature in each of the branches, initial values and boundary values of temperature, water-vapor density and carbon dioxide concentration in each of the branches, by using, as input data, the space structure model data, analysis result data obtained from the first processing portion, data concerning thermal characteristic of the moving body, data of outside-air temperature, outside-air humidity and outside-air carbon dioxide concentration, and data of passengers which go in and out of the space; a third processing portion for calculating wall temperature, field temperature and airflow temperature in each of the branches, by using, as input data, the space structure model data, airflow analysis result data obtained from the first processing portion and thermal analysis result data obtained from the second processing portion; and a fourth processing portion for performing detailed calculation of the airflow velocity, temperature, humidity and carbon dioxide concentration for calculating time-varying data of airflow temperature, water-vapor density and carbon dioxide concentration in each of the branches by using, as input data, the space structure model data, the airflow analysis result data obtained from the first processing portion, the thermal analysis result data obtained from the second processing portion, and wall and field temperature data obtained from the third processing portion.

Preferably, the first processing portion outputs the airflow velocity in each of the branches as one-day's time-varying information.

Preferably, the second processing portion outputs the airflow temperature, airflow humidity, wall temperature and field temperature in each of the branches as time-varying information in accordance with passage of seasons in one year.

Preferably, the third processing portion outputs wall temperature and field temperature in each of the branches as time-varying information in 20 years.

Preferably, the subsurface space is a subsurface space constituting a subway; the subsurface space structure model data is a station structure model data; and the moving body is a vehicle which runs in a tunnel.

The foregoing objects of the present invention are achieved by an air-conditioning and ventilation simulator for predicting environmental conditions in a subsurface space, comprising: a first processing portion for obtaining the airflow velocity in branches such as a tunnel, stairs, passages, vents, etc. constituting the subsurface space by using, as input data, subsurface space structure model data concerning the branches and movement data of a moving body which makes air move in the subsurface space; a second processing portion for calculating initial values of wall temperature and field temperature in the respective branches, short-term change values of wall temperature and field temperature in the respective branches, initial values of inside temperature, water-vapor density and $CO_2$ concentration in the respective branches and boundary values of inside temperature, water-vapor density and $CO_2$ concentration in the respective branches by using, as input data, the space structure model data, analysis result data obtained from the first processing portion, data concerning thermal characteristic of the moving body, data of outside-air temperature, outside-air humidity and outside-air $CO_2$ concentration and data of passengers which go in and out of the space; a third processing portion for calculating wall temperature and field temperature in the respective branches and airflow temperature in the respective branches by using, as input data, the space structure model data, the airflow analysis result data obtained from the first processing portion and the thermal analysis result data obtained from the second processing portion; and a fourth processing portion for performing detailed calculation of the airflow velocity, temperature, humidity and $CO_2$ concentration for calculating time-varying data of airflow temperature, water-vapor density and $CO_2$ concentration in the respective branches by using, as input data, the space structure model data, the airflow analysis result data obtained from the first processing portion, the thermal analysis result data obtained from the second processing portion and the wall and field temperature data obtained from the third processing portion.

DESCRIPTION OF THE PREFERRED EMBODIMENT

An embodiment of the air-conditioning and ventilation simulator according to the present invention will be described below in detail with reference to the drawings.

Figure 1:
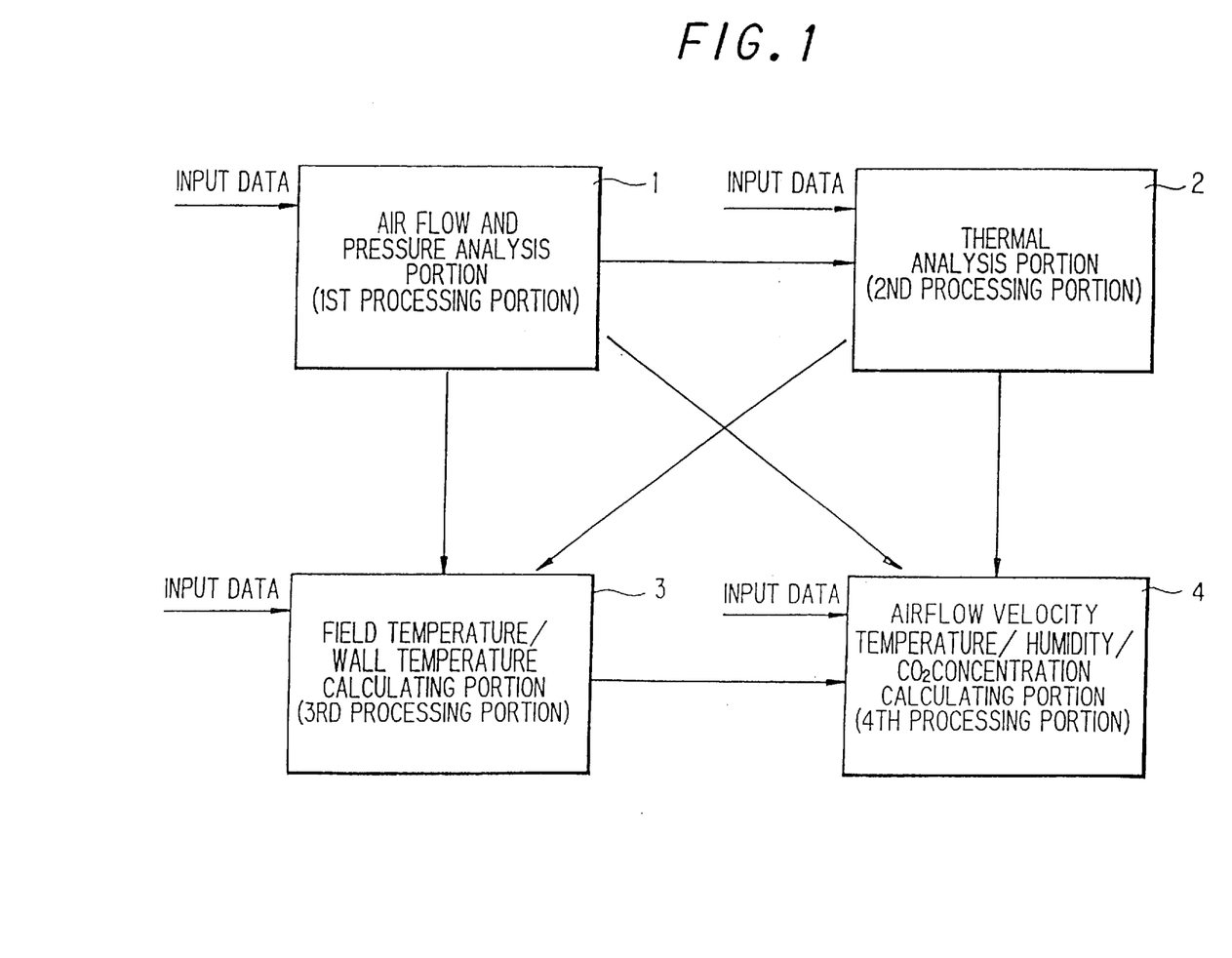
FIG. 1 is a block diagram showing the functional configuration of an air-conditioning and ventilation simulator according to an embodiment of the present invention.
Figure 2:
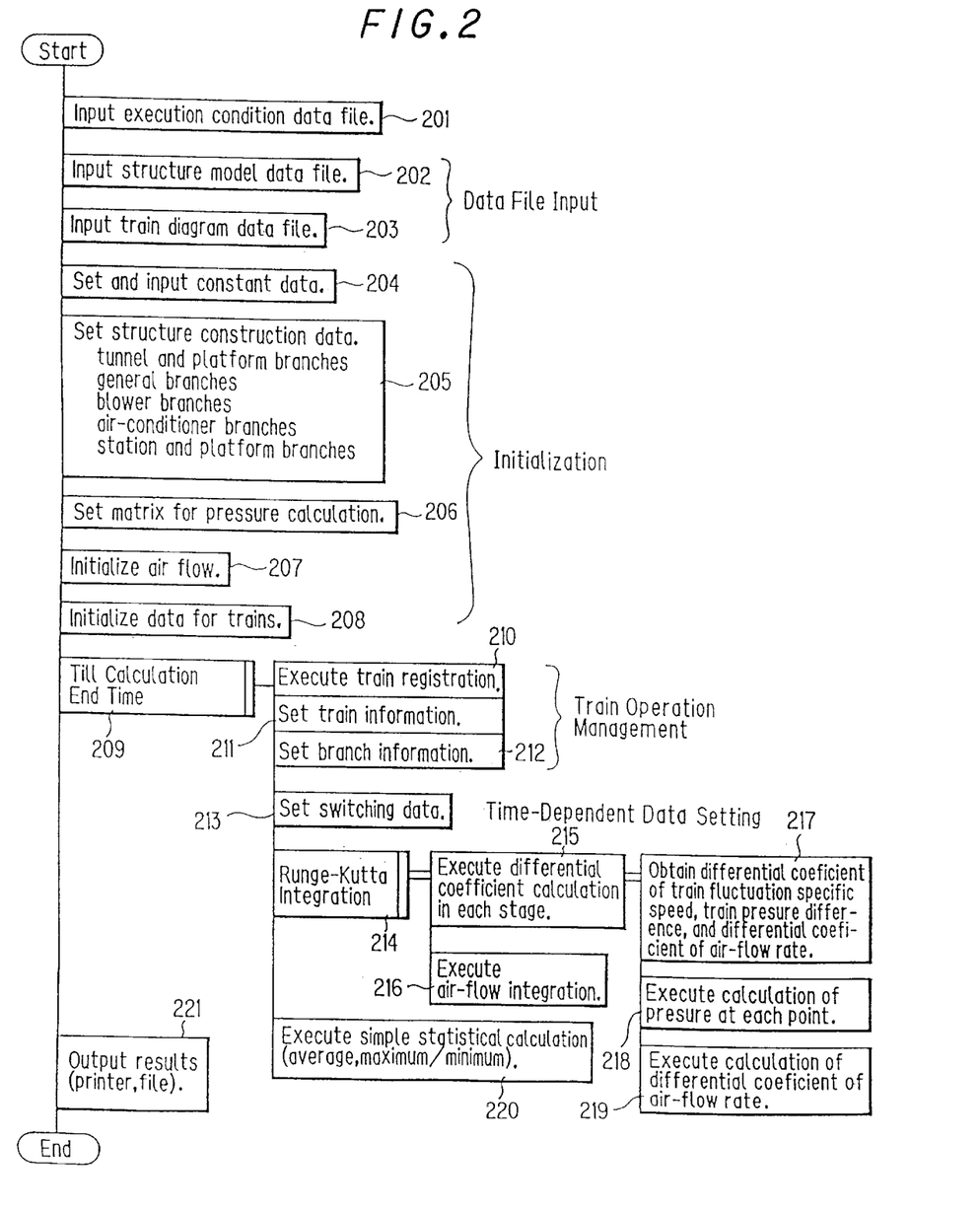
FIG. 2 is a flow chart for explaining the processing operation of an airflow and pressure analysis portion which is a first processing portion.
Figure 3:
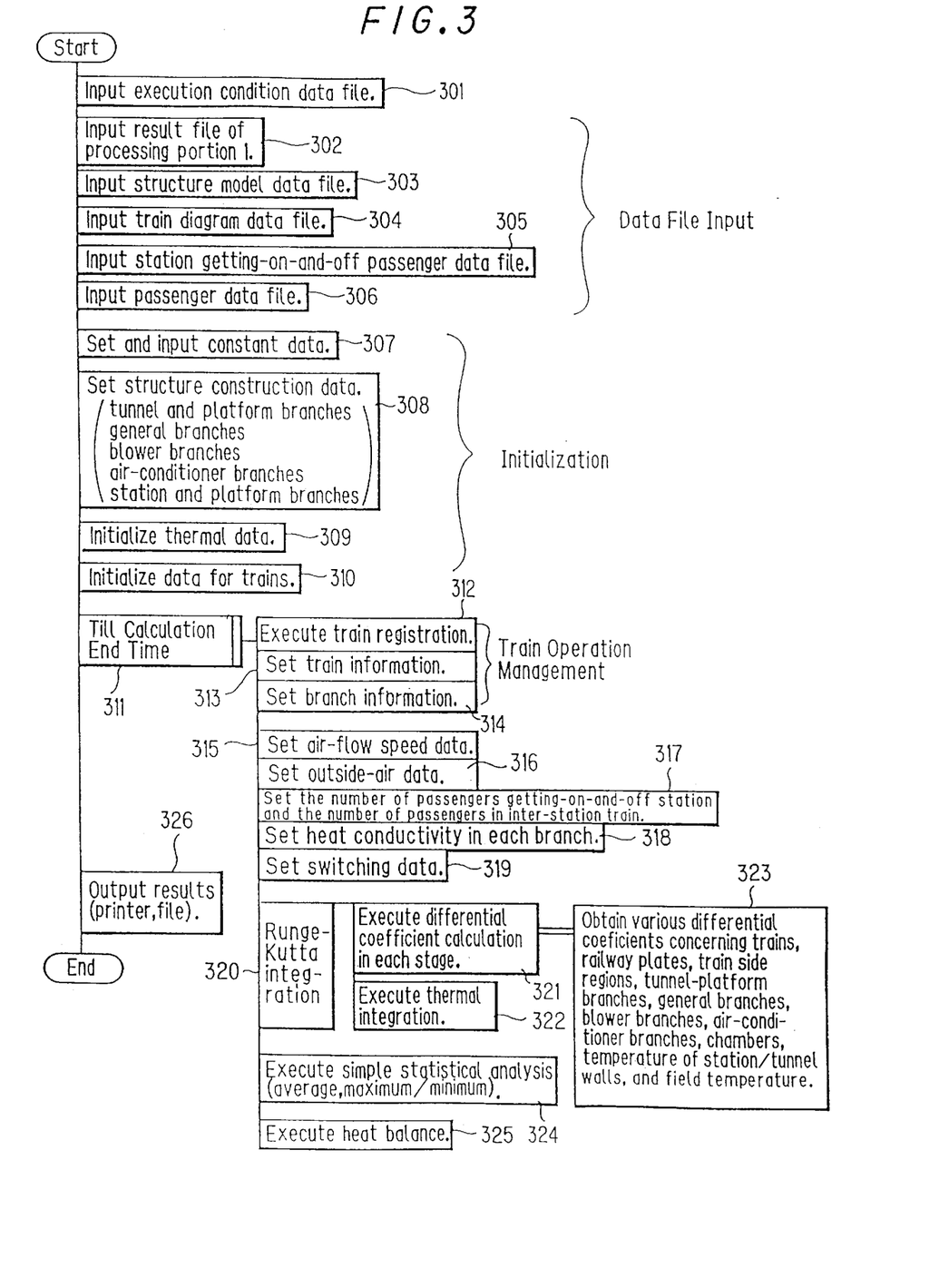
FIG. 3 is a flow chart for explaining the processing operation of a thermal analysis portion which is a second processing portion.
Figure 4:
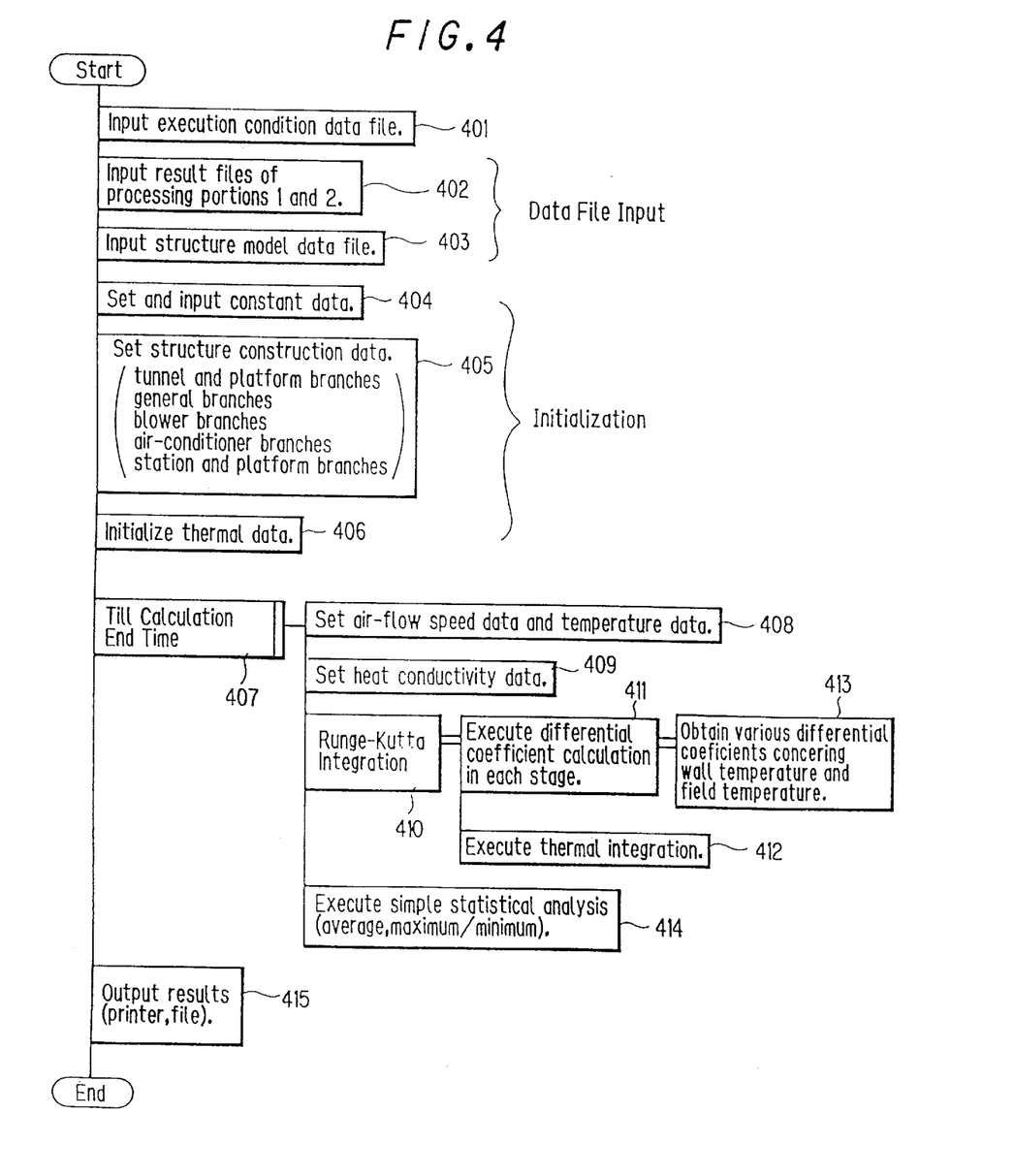
FIG. 4 is a flow chart for explaining the processing operation of a field and wall temperature calculating portion which is a third processing portion.
Figure 5:
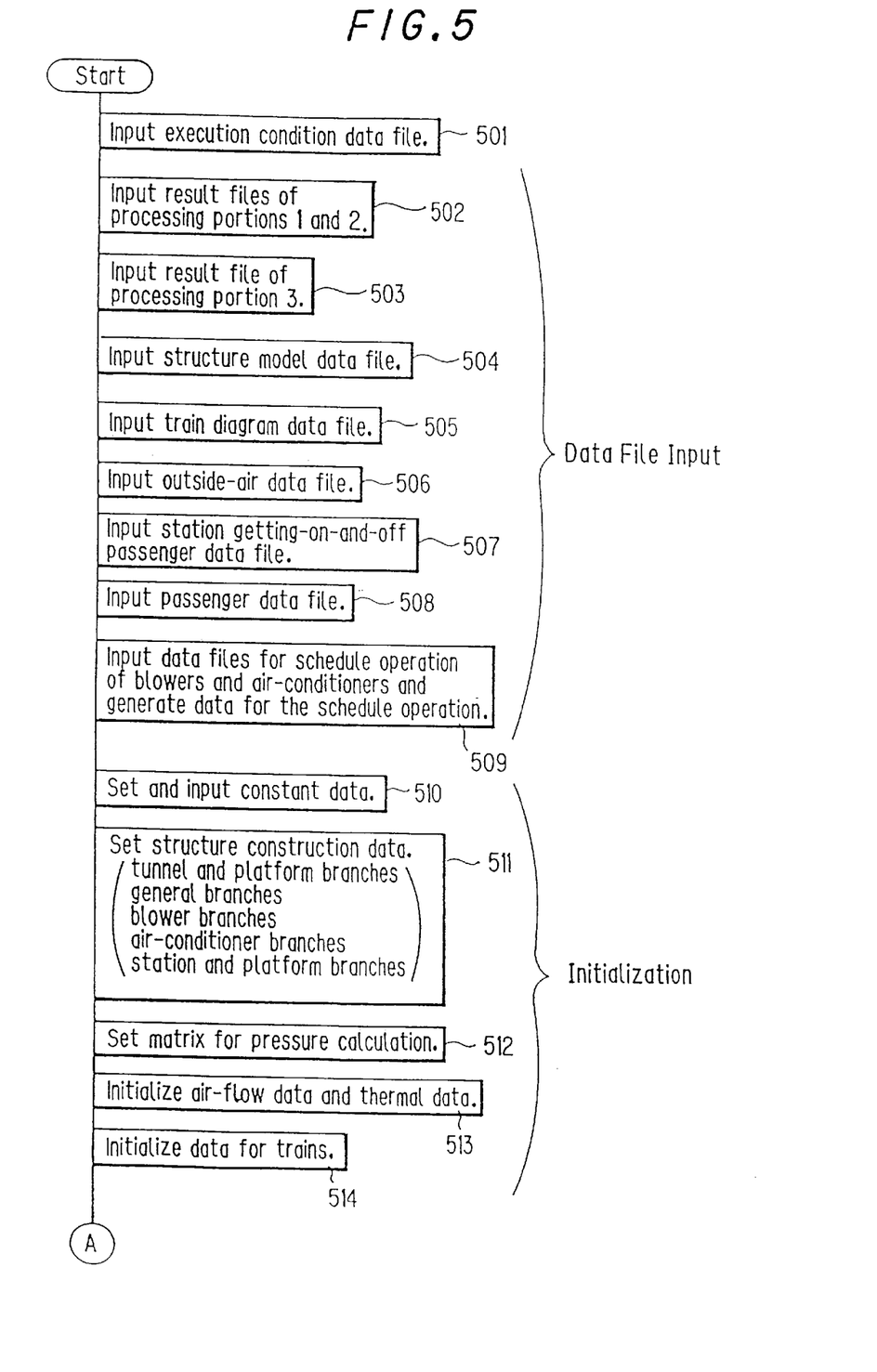
FIG. 5 is a flow chart for explaining a first half of the processing operation of a detailed calculating portion, which is a fourth processing portion, for calculating the airflow velocity, temperature, humidity, and $CO_2$ concentration.
Figure 6:
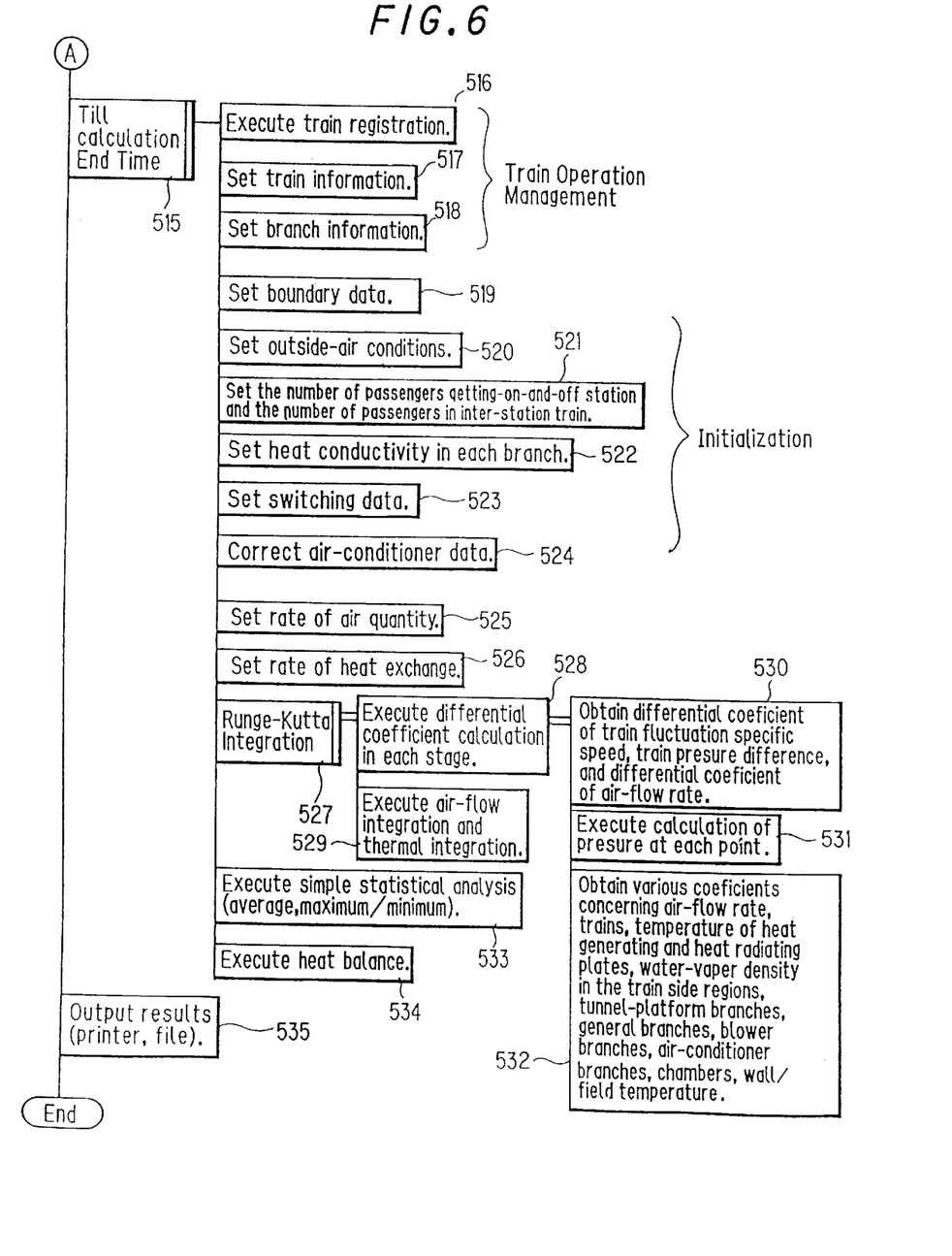
FIG. 6 is a flow chart for explaining a second half of the processing operation of the above-mentioned detailed calculating portion which is the fourth processing portion.
Figure 7:
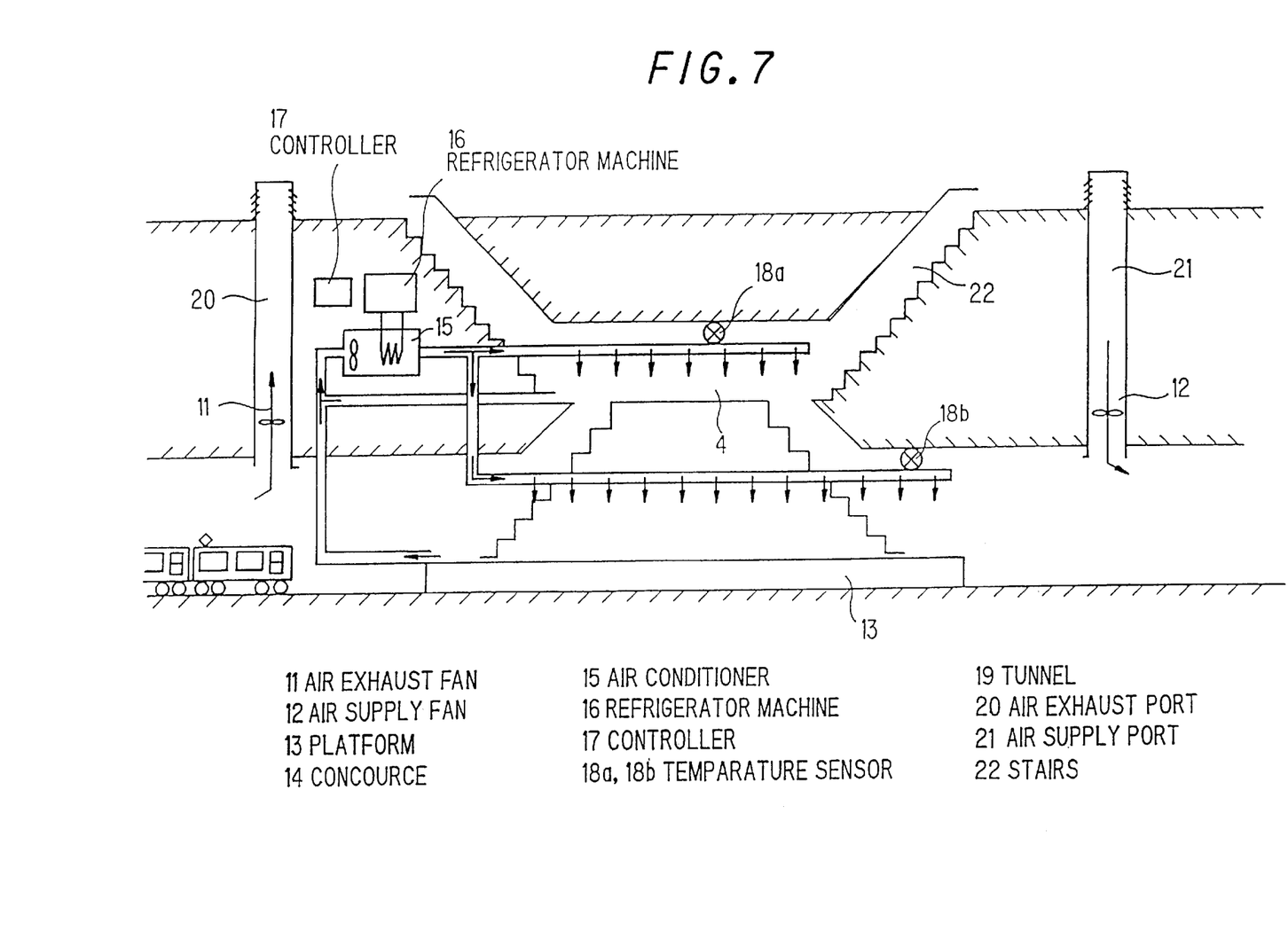
FIG. 7 is a view of an example of structure of a subsurface space to be simulated in the embodiment of the present invention.

FIG. 1 is a block diagram showing the functional configuration of the air-conditioning and ventilation simulator according to an embodiment of the present invention; FIG. 2 is a flow chart for explaining the processing operation of airflows and pressure analysis portion which is a first processing portion; FIG. 3 is a flow chart for explaining the processing operation of a thermal analysis portion which is a second processing portion; FIG. 4 is a flow chart for explaining the processing operation of an field and wall temperature computing portion which is a third processing portion; FIG. 5 is a flow chart for explaining a first half (1) of the processing operation of a detailed computing portion, which is a fourth processing portion, for calculating the airflow velocity, temperature, relative humidity and $CO_2$ concentration; FIG. 6 is a flow chart for explaining a second half of the processing operation of the above detailed computing portion which is the fourth processing portion; and FIG. 7 is a view showing a structural example of the subsurface space to be simulated in the embodiment of the present invention. In FIGS. 1 and 7, the reference numeral 1 designates an airflow and pressure analysis portion; 2, a thermal analysis portion; 3, an field and wall temperature calculating portion; 4, a detailed calculating portion for calculating the airflow velocity, temperature, humidity and $CO_2$ concentration; 11, an air exhaust fan; 12, an air supply fan; 13, a platform; 14, a concourse; 15, an air-conditioner; 16, a refrigerating machine; 17, a controller; 18a and 18b, temperature sensors; 19, a tunnel; 20, an air exhaust port; 21, an air supply port; and 22, stairs.

An embodiment of the present invention will be described below on the assumption that the present invention is applied to a subway system.

As shown in FIG. 1, the air-conditioning and ventilation simulator according to an embodiment of the present invention comprises an airflow and pressure analysis portion (hereinafter referred to as first processing portion) 1, a thermal analysis portion (hereinafter referred to as second processing portion) 2, an field and wall temperature calculating portion (hereinafter referred to as third processing portion) 3, and a detailed calculating potion (hereinafter referred to as fourth processing portion) 4 for calculating the airflow velocity, temperature, humidity and $CO_2$ concentration.

In the present invention, it is assumed that the aforementioned processing portions are constructed in a known electronic computer such as a workstation, or the like, and that data, or the like, necessary for processing are inputted from files constructed in an external memory or the like and the data of processing results are delivered to other processing portions, and displayed on a display unit, and printed out as occasion demands. Accordingly, the description about the hardware configuration of the computer such as a workstation, or the like, will be omitted here.

Referring now to FIG. 7, an example of a station structure in a subway system will be described as an example of the structure of the subsurface space to be simulated in the embodiment of the present invention.

In FIG. 7 which shows a station structure in a subway system very briefly, the station structure has: a tunnel 19 which is connected to adjacent stations and through which trains are operated to run; a platform 13; stairs 22 and a concourse 14 led to the ground; an air exhaust port 20 and an air supply port 21 provided with an air exhaust fan 11 and an air supply fan 12, respectively, for replacing inside air by outside air; and an air-conditioner 15 provided with a refrigerating machine 16 for air-conditioning the station structure and operated by a controller 17 on the basis of information supplied from temperature sensors 18a and 18b.

The embodiment of the present invention is designed so that the airflow velocity, temperature, humidity and $CO_2$ concentration in the tunnel 19, the stairs 22, the concourse 14, the air exhaust port 20, the air supply port 21, etc. in the station structure configured as in the example described above are predicted, and that wall temperature, field temperature, etc. in the aforementioned structure are predicted.

Referring next to FIG. 1, the functions of the respective processing portions will be described briefly.

As will be described later in detail, the first processing portion 1 for analyzing the airflow and pressure uses, as input data, station structure model data, train diagram data, train characteristic data, etc. to calculate a train pressure difference on the side region of a train in a branch where the train exits, and further to calculate the airflow velocity in a tunnel branch, a platform branch, a general branch, an air supply fan branch, an air exhaust fan branch and an air-conditioner branch. Data of the airflow velocity in these branches are outputted as time-varying data so that 24-hours' data obtained at time intervals of 10 sec. are supplied to the second, third and fourth processing portions 2 to 4.

The calculation of the quantity of airflows generated on the basis of a train pressure difference is performed without use of any drag coefficient of the air of a moving train as in the conventional technique. For example, the calculation may be performed by using various theories described, for example, in "NAGARE", the Japan Society of Fluid Mechanics, Vol. 12, No. 4, Dec. 30, 1993, etc.

Using as input data, data concerning the station structure model, data concerning the outside-air temperature, data concerning the outside-air humidity, data concerning the outside-air $CO_2$ concentration, data concerning passengers getting on and off in the station, data concerning the thermal characteristics of trains, data concerning airflows analyzed by the first processing portion 1, and so on, the second processing portion for performing thermal analysis calculates the temperature, water-vapor density and $CO_2$ concentration concerning the respective branches, the station and the tunnel to thereby calculate the initial values and short-term change quantities of the tunnel wall temperature and field temperature which are to be used in the third processing portion 3, and the initial values and boundary values of the temperature, water-vapor density and $CO_2$ concentration in the trains, branches, station and tunnel which are to be used in the fourth processing portion 4. These data are outputted as 365 days' data at predetermined intervals of time.

The third processing portion 3 for calculating the field and wall temperature uses, as input data, the data concerning the station structure model, the data concerning the result of airflow analysis obtained from the first processing portion 1, and the data concerning the result of thermal analysis obtained from the second processing portion 2 to calculate the time-varying data of at intervals of 6 hours for 20 years concerning the wall and field temperature in the station and tunnel which are to be used in the fourth processing portion 4.

The fourth processing portion 4 for calculating in detail the airflow velocity, temperature, humidity, and $CO_2$ concentration uses, as input data, the station structure model data, the data of the result of airflow analysis obtained from the first processing portion 1, the data of the result of thermal analysis obtained from the second processing portion 2, and the data of the result of field and wall temperature calculation obtained from the third processing portion to calculate the time-varying data and statistical analysis data (the average, maximum, minimum) concerning the airflows in each branch, and the temperature, water-vapor density and $CO_2$ concentration in the train, branches, station and tunnel, respectively.

The operations of the aforementioned respective processing portions constituting an embodiment of the present invention will be described below with reference to flow charts.

In detail, the first processing portion 1 uses, as input data, execution condition data, detailed branch structure data, structure construction data, branch-dependent management data, continuation initial data and constant data.

The execution condition data are data which give the start time of simulation, the end time of simulation, the names of inside files (structure model data, train diagram data) to be used for calculation, information as to whether the continuation initial data are to be used or not, and information as to whether the processing result is to be printed out or not.

The detailed branch structure data are data which give physical characteristic data of the respective branches (tunnel, platform, stairs, passages, exits and entrances, relaxation pits, ducts, air supply fan, air exhaust fan, air-conditioner), coefficients of pressure loss in wall surfaces and branch ends, various kinds of calorific power, the stay time of passengers, and various coefficients.

The structure construction data are data which give the total number of branches connected to each inside branch-connection point, the generic classification of branches connected to the inside point, indexes in the generic classification of branches, the generic classification of partner points to be connected, and indexes in the generic classification of partner points. The structure construction data are given from a subway system structure construction portion not shown.

The branch-dependent management data are data which give the number of trains subjected to calculation in a branch in which a train exists, the font and rear end positions of the train, the velocity of the train, the acceleration of the train and the length of the train. The branch-dependent management data are given from a train operation management portion not shown.

The continuation initial data are data which give the value of the airflow ratio in each branch at the time of the start of simulation in the first processing portion, and the velocity of airflows caused by a moving train which is the airflow velocity in at near field of the moving train on the basis of the theory disclosed in the above-mentioned "NAGARE", or the like.

Upon reception of the aforementioned data, the first processing portion 1 calculates the airflow velocity in each branch and the pressure at each point and outputs the analysis result data, the print-out data and the continuation initial value data for other processing portions. The analysis result data are outputted as time-varying data of the airflow velocity obtained correspondingly to each branch and used in the second, third and fourth processing portions 2 to 4 so that 24 hours' data obtained at intervals of 10 sec. are outputted.

The subway system structure construction portion giving the structure construction data, and the train operation management portion giving the branch-dependent management data will be described below briefly though these portions have no direct relation to the present invention.

The subway system structure construction portion outputs the aforementioned structure construction data necessary for the present invention as part of output data by using, as input data: the overall structure list data; and the overall structure branch list data containing the total number of stations constituting the whole subway, the total number of points, the number of branches for each group, the total number of branches for all groups, the structure of respective stations in the subway system, and the train route structure data. Further, the train operation management portion outputs the aforementioned branch-dependent management data necessary for the present invention as part of output data by using, as input data: the train diagram data containing the total number of trains to be made to run, vehicle operating data, and diagram pattern data; the run curve data giving the running characteristic of trains in each station and the calorific power of the trains and railway plates; and the route construction data.

The operation of the first processing portion will be described below with reference to the flow chart of FIG. 2.

(1) First, the processing start time and processing end time in this processing portion, the name of a structure model data inside file, the name of a train diagram data inside file, the information as to whether continuation initial value data are to be used or not, and the name of a continuation initial value data file in the case of using the continuation initial data, are read from an execution condition data file not shown (step 201).

(2) Then, the structure model data inside file is read so that respective data are stored as inside variables, and the train diagram data inside file is read and the respective data are stored as inside variables (steps 202 and 203).

(3) For initialization, the constant data file is read so that respective constant data are stored as inside variables, and the structure construction data given from the aforementioned subway system structure construction portion not shown are stored. Further, an airflow ratio coefficient matrix to be used for solving the pressure-calculation simultaneous linear equations given from the subway system structure construction portion is set (steps 204 to 206).

(4) Standard values are set as the airflow velocity in respective branches, the airflow velocity values in respective branches are set as continuation integration initial value data, and, at the same time, the initial states of trains are set (step 207).

(5) The data file input and initialization are terminated upon completion of execution in the step. Then, train registration, train information setting and branch information setting are performed at predetermined intervals of time (1 sec.). These data are data obtained from the train running management portion not shown. On the basis of these data, information as to whether an operated train is appearing in the railway system or whether the operated train is before or after its appearance is registered at intervals of 1 sec. as train registration; a route index concerning the operated train, the distance from a reference position, the velocity of the train, the acceleration of the train and the calorific power of the train and railway plates (secondary conductor for linear motors) are set as the train information; and the number of a branch where a train exists is set as the branch information (steps 209 to 212).

(6) Then, ON/OFF time data for the air supply fan, air exhaust fan, air-conditioner, or the like, are set as time-dependent data (step 213).

(7) Using the respective data set in the aforementioned steps, differential coefficient calculation and airflow integration in respective stages are performed while integration is controlled by the Runge-Kutta method to thereby calculate a coefficient of the velocity of airflows cased by a moving train in each train side region in a branch in which the moving train exists, calculate a train pressure difference in each train side region in the branch in which the train exists and calculate a differential coefficient of the airflow ratio in each of the tunnel branch, platform branch, general branch, air supply fan branch, air exhaust fan branch and air-conditioner branch (steps 214 to 217).

(8) Then, a coefficient of the airflow ratio is calculated and pressure at each point is calculated by an active column method using simultaneous linear equations, so that a differential coefficient of the airflow ratio in each branch is calculated on the basis of the results of calculation of the coefficient of the airflow ratio and the pressure (steps 218 and 219).

(9) Simple statistical analysis is performed so that the plus side average, the minus side average and the number of times of appearance in each branch at intervals of one hour are obtained by averaging calculation and the minimum and maximum values, the time of appearance and the number of times of appearance in each branch at intervals of one hour are obtained by minimum-maximum calculation (step 220).

(10) Finally, a continuation initial data file and an analysis result data file are outputted as output data files (step 221).

In the arithmetic operation of the airflow velocity and pressure in the aforementioned steps 214 to 217, pressure at each of connection points between the tunnel and respective sections of the station is calculated on the basis of the movement of air in the tunnel due to the movement of the train and the ventilation capacity of the ventilator, so that air velocity between respective connection points, that is, air velocity in each branch is calculated on the basis of the pressure difference between the connection points and the pressure loss between the connection points. The air velocity can be calculated by solving the following balance equation (1):

$$\begin{aligned}
\text{airflow ratio change quantity } (dQ_t/dt) = & \\
\text{airflow leading-in quantity based on entrance end pressure} & \\
((A_t/\rho(L_t - l_g))P_{in}) + & \\
\text{airflow leading-in quantity based on exit end pressure} & \\
((A_t/\rho(L_t - l_g))P_{ex}) + & \\
\text{generated airflow quantity due to train pressure difference} & \\
((A_t/\rho(L_t - l_g))\delta P) + & \\
\text{quantity of reduction of airflow ratio due to section wall surface fluid drag} & \\
(-\lambda/2A_t D_t)|D_t|Q_t + & \\
\text{quantity of reduction of airflow ratio due to section end} & \\
\text{branch/confluence drag} & \\
(-\zeta/2A_t(L_t - l_g))|D_t|Q_t &
\end{aligned} \quad (1)$$

in which $Q_t$ is airflow ratio (m³/s), t is time (s), $A_t$ is flow path sectional area (m²), $\rho$ is airflow density (Kg/m³), $L_t$ is section length (m), $l_g$ is train length (m), $P_{in}$ is entrance end pressure (Pa), $P_{ex}$ is exit end pressure (Pa), $\delta P$ is train pressure difference (Pa), $\lambda$ is wall surface drag coefficient (−), $D_t$ is equivalent tunnel diameter (m), and c is entrance end drag coefficient (−).

In detail, the second processing portion 2 uses, as input data, execution condition data, airflow analysis result data obtained from the first processing portion 1, detailed branch structure data, structure construction data, train-dependent management data, branch-dependent management data, station getting-on-and-off passenger data, inter-station passenger data, continuation initial data, and constant data.

The execution condition data are data which give the name of the airflow analysis result data file obtained from the first processing portion 1, the name of the inside data (station getting-on-and-off passenger data and inter-station passenger data) file, data as to whether the continuation initial data is to be used or not and data as to whether processing results are to be printed out or not.

The continuation initial data are data which give temperature, water-vapor density and $CO_2$ concentration values concerning each branch at the time of the starting of processing in the second processing portion 2, the temperature and water-vapor density values concerning the train, and temperature values concerning the station and tunnel.

Upon reception of the aforementioned data, the second processing portion 2 calculates the temperature, water-vapor density and $CO_2$ concentration values concerning each branch and concerning the station and tunnel, and outputs analysis result data, print-out data and continuation initial data for other processing portions. The analysis result data are data which give: initial values and short-term change values of wall temperature of the station and tunnel, and initial values and short-term change values of field temperature to be used in the third processing portion 3; and initial values and boundary values of temperature, water-vapor density and $CO_2$ concentration of train, branch, station and tunnel to be used in the fourth processing portion 4. The analysis result data are outputted as 365 days' data.

Referring next to the flow chart of FIG. 3, the operation of the second processing portion will be described.

(1) First, the name of the airflow analysis result data file obtained from the first processing portion 1, the name of the station getting-on-and-off passenger data inside file, the name of the inter-station passenger data inside file, information as to whether continuation initial data are to be used or not, and information as to whether result data are to be printed out or not, are read from the execution condition data file not shown (step 301).

(2) The airflow analysis result data inside file obtained from the first processing portion 1 is read and the respective data are stored as inside variables; the structure model data inside file is read and the respective data are stored as inside variables; and the train diagram data inside file is read and the respective data are stored as inside variables (steps 302 and 304).

(3) The station getting-on-and-off passenger data inside file and the inter-station passenger data inside file are read and the respective data are stored as inside variables; and the constant data file is read and the respective data are stored as inside variables (steps 305 to 307).

(4) The structure construction data given from the subway structure construction processing portion described above but not shown are stored, and standard values are set as the temperature, water-vapor density and $CO_2$ concentration values concerning each branch, the temperature and water-vapor density values concerning the train, and the temperature values concerning the station and tunnel for initialization of integration. Further, the continuation initial value data file is read and the temperature, water-vapor density and $CO_2$ concentration values concerning each branch, the temperature and water-vapor density values concerning the train and temperature values concerning the station and tunnel are set (steps 308 to 310).

(5) The data file input and initialization are completed in the aforementioned steps. Then, the train registration, train information setting and branch information setting are performed at predetermined intervals of time (1 sec.). These data are data obtained from the train operation management portion not shown. On the basis of these data, information as to whether an operated train appears in the railway system or whether the train is before or after its appearance is registered at intervals of 10 sec. as the train registration; a route index concerning the operated train, the distance from a reference position, the velocity of the train, the acceleration of the train and the calorific power of the train and railway plates (secondary conductor for linear motor) are set as the train information, and the number of a branch where the train exists is set as the branch information (steps 312 to 314).

(6) Then, the values of the airflow velocity, outside-air temperature and water-vapor density in each branch, the number of passengers existing in each station, the number of passengers existing in the train running between stations, and the values of heat conductivity of the branch wall surfaces, chamber wall surfaces, train surfaces and railway plate surfaces are set as time-dependent data (steps 315 to 318).

(7) Then, ON/OFF data for the air supply fan, air exhaust fan, air-conditioner, etc. are set as data dependent on one-day's business hours, and as data dependent on the seasons in one year, respectively (step 319).

(8) Using the respective data set by the aforementioned steps, differential coefficient calculation and thermal integration in respective stages are performed while integration is controlled by the Runge-Kutta method to calculate the differential coefficients of the airflow temperature and water-vapor density of the train existing in the railway system and the differential coefficients of train temperature to thereby obtain the differential coefficients of temperature of heat-generating railway plates striking on the lower portion of the train existing in the railway system and the differential coefficients of temperature of heat-radiating railway plates on which no train is running. Further, the differential coefficients of the airflow temperature and water-vapor density of the side region of the train existing in the railway system and the differential coefficients of the airflow temperature, water-vapor density and $CO_2$ concentration in the tunnel and platform branch portions where no train is running are obtained.

Further, the differential coefficients of the airflow temperature, water-vapor density and $CO_2$ concentration in general branches, the differential coefficients of the airflow temperature, water-vapor density and $CO_2$ concentration in air supply fan and air exhaust fan branches, the differential coefficients of the airflow temperature, water-vapor density and $CO_2$ concentration in air-conditioner branches, the differential coefficients of the airflow temperature, water-vapor density and $CO_2$ concentration in chambers, and the differential coefficients of wall temperature and field temperature in station and tunnel branches are obtained (steps 320 to 323).

(9) Simple statistical analysis is performed so that the plus-side and minus-side averages of the airflow temperature, water-vapor density and $CO_2$ concentration in each branch on one day in each season are obtained by averaging calculation. Further, the minimum and maximum values of the airflow temperature, water-vapor density and $CO_2$ concentration in each branch on one day in each season, and the time of generation of the minimum and maximum are obtained, and calculation concerning heat balance is performed (steps 324 and 325).

(10) Finally, a continuation initial data file and an analysis result data file are outputted as output data files (step 326).

In the arithmetic operation of temperature and humidity in the model of thermal analysis by the aforementioned steps 320 to 323, the following balance equations (2) and (3) are solved on the basis of the air velocity in the tunnel, the ventilation capacity of the ventilator, the quantities of heat generated by the train in the tunnel and station and the quantities of heat radiated to the outside air and into the ground to thereby obtain the quantities of the airflow heat and train heat on the basis of the quantity of heat generated in each of sections obtained by dividing the tunnel and station.

$$
\begin{aligned}
&\text{time change ratio of airflow heat quantity } (\rho c \Omega (dT/dt) = \quad (2)\\
&\quad \text{quantity of heat flowing in from an adjacent section}\\
&\quad\quad (\rho c A_s V(T_I - T)) +\\
&\quad \text{quantity of sensible heat from the train}\\
&\quad\quad (a_g S_g (U - V)(T_g - T)) +\\
&\quad \text{quantity of heat radiated from the train}\\
&\quad\quad (\epsilon_g B S_g (T_g - T)) + \text{quantity of sensible heat from the wall surface}\\
&\quad\quad (a_w S_w (T_w - T)) +\\
&\quad \text{quantity of heat radiated from the wall surface}\\
&\quad\quad (\epsilon_w B S_w (T_w^4 - T^4)) +\\
&\quad \text{quantity of heat generated from an apparatus } (Q_E) +\\
&\quad \text{quantity of heat generated from passengers getting on and off the train}\\
&\quad\quad (n_c Q_c) + \text{quantity of ventilation heat from the train}\\
&\quad\quad (n_c Q_c) + \text{quantity of heat radiated due to cooling the train}\\
&\quad\quad\quad\quad\quad\quad\quad\quad\quad (\rho c q_R (T_R - T))
\end{aligned}
$$

in which $\rho$ is airflow density (kg/m$^3$), c is airflow specific heat (J/kgK), $\Omega$ is airflow volume (m$^3$), T is airflow temperature (K), t is time (sec.), $A_s$ is airflow path sectional area (m$^2$), V is airflow velocity (m/s), $T_I$ is adjacent section airflow temperature (K), $a_g$ is train surface heat conductivity (W/m$^2$K), $S_g$ is train surface area (m$^2$), $T_g$ is train temperature (K), U is train velocity (m/s), $a_w$ is wall surface heat conductivity (W/m$^2$K), $T_w$ is wall surface temperature (K), $\epsilon_g$ is train heat-radiation ratio (-), $\epsilon_w$ is wall surface heat-radiation ratio from the train (-), B is Boltzmann's constant, $Q_m$ is quantity (W) of heat generated in an apparatus, $n_c$ is the number of passengers (persons) getting on and off the train, $Q_c$ is quantity (W) of heat generated from passengers getting on and off the train, $q_R$ is quantity of ventilation of the train (m$_3$) and $T_R$ is airflow temperature (K) in the train.

$$
\begin{aligned}
&\text{Time change of train heat quantity } (\Omega(dH/dt)) = \quad (3)\\
&\quad \text{quantity of water vapor flowing in from an adjacent section}\\
&\quad\quad (AT|U - V|(H_T - H)) +\\
&\quad \text{quantity of water vapor released from the train by ventilation}\\
&\quad\quad (q_R (H_R - H)) + \text{quantity of water vapor from a spring}\\
&\quad (L d_w W_2) + \text{quantity of evaporation (condensation) from the wall surface}\\
&\quad\quad (L_H S_w W_1) + \text{quantity of water vapor from passengers getting}\\
&\quad\quad\quad \text{on and off the train } (n_c W_c) +\\
&\quad \text{quantity of water vapor released due to cooling the train } (W_R)
\end{aligned}
$$

in which H is water vapor density (kg/m$^3$), $A_T$ is airflow sectional area (m$^2$), $H_T$ is adjacent section water vapor density (kg/M$^3$), $q_R$ is train ventilation quantity (m$^3$), $H_R$ is water vapor density (kg/m$^3$) in the train, L is section length (m), $d_w$ is spring side groove width (m), $W_2$ is spring water vapor quantity (kg/m$^3$), $L_H$ is evaporated latent heat (W), $S_w$ is wall surface area (m$^2$), $W_1$ is the quantity of evaporation (condensation) (kg/m$^3$) from the wall surface, $W_c$ is the quantity of water vapor (kg/m$^3$)) released from passengers getting on and off the train, and $W_R$ is the quantity of water vapor released from the train cooler (kg/m$^3$).

In detail, the third processing portion 3 uses, as input data, execution condition data, thermal analysis result data obtained from the second processing portion 2, airflow analysis result data obtained from the first processing portion 1, detailed branch structure data, structure construction data, continuation initial data and constant data.

The execution condition data are data which give the term of processing in this processing portion 3, the name of the thermal analysis result data file obtained from the second processing portion 2, the name of the airflow analysis result data file obtained from the first processing portion 1 and the information as to whether the processing results are to be printed out or not.

Upon reception of the aforementioned data, the third processing portion 3 obtains the wall and field temperatures in each of the station and tunnel branches and the airflow temperature in each branch, and outputs the obtained data as analysis result data and as print-out data. The analysis result data are data which give the wall and field temperatures in each of the station and tunnel branches, and the airflow temperature in each branch to be used in the fourth processing portion 4 and which indicate changes thereof at intervals of 6 hours in 20 years.

Referring next to the flow chart of FIG. 4, the operation of the third processing portion will be described.

(1) First, the term of processing and the name of the thermal analysis result data file obtained from the second processing portion 2 are read from the execution condition data file not shown (step 401).

(2) The thermal analysis result data inside file obtained from the second processing portion 2 is read and the name of the airflow analysis result data inside file obtained from the first processing portion 1 and the respective data are stored as inside variables; and the airflow analysis result data inside file obtained from the first processing portion 1 is read and the name of the structure model data file and the respective data are stored as inside variables. Further, the structure model data inside file is read and the respective data are stored as inside variables; and the constant data file is read and the respective data are stored as inside variables (steps 402 to 404).

(3) The structure construction data given from the subway structure construction processing portion described above but not shown are stored, and standard values are set as the wall and field temperatures in each branch at the final time on the basis of the thermal analysis result data obtained from the second processing portion 2 for initialization of integration (steps 405 and 406).

(4) Then, the airflow velocity in each of branches constituting the station, the airflow velocity in the tunnel branch and the differential coefficients of wall temperature therein in the preceding year are set and the thermal conductivity in each of branches constituting the station, chambers and the tunnel is set (steps 407 to 409).

(5) Using the respective data set by the aforementioned steps, differential coefficient calculation and thermal integration in respective stages are performed while integration is controlled by the Runge-Kutta method to thereby calculate the differential coefficients of the wall temperature in station and tunnel branches and calculate the differential coefficients of the field temperature in station and tunnel branches (steps 410 to 413).

(6) Simple statistical analysis is performed so that the average, maximum and minimum values of the airflow temperature in the station and each of branches constituting the station are calculated (step 414).

(7) Finally, a continuation initial data file and an analysis result data file are outputted as output data files (step 415).

In detail, the fourth processing portion 4 uses, as input data, the execution condition data, the airflow analysis result data obtained from the first processing portion 1, the thermal analysis result data obtained from the second processing portion 2, the analysis result data obtained from the third processing portion 3, the structure construction data, the detailed branch structure data, the train-dependent management data, the branch-dependent management data, the station getting-on-and-off passenger data, the inter-station passenger data, the outside-air data, the continuation initial data and the constant data.

The execution condition data are data which give the name of the airflow analysis result data file obtained from the first processing portion 1, the name of the thermal analysis result data file obtained from the second processing portion 2, the name of the analysis result data file obtained from the third processing portion 3, the respective names of the inside files (files of structure model, outside-air data, station getting-on-and-off passenger data and inter-station passenger data), the information as to whether the continuation initial data are to be used or not, and the information as to whether the results are to be printed out or not.

The continuation initial data are data which give the values of the airflow velocity, temperature, water-vapor density and $CO_2$ concentration concerning respective branches, the values of the temperature and water-vapor density concerning the train and temperature values concerning the station and tunnel at the time of the start of the processing in the fourth processing portion 4. The other data are identical to those described above as the input data of the first, second and third processing portions.

Upon reading the aforementioned data, the fourth processing portion 4 calculates the airflow and thermal data in each branch, and outputs the data as print-out data and as continuation initial data. The print-out data give the time changes and statistical analysis (average, maximum and minimum values) of the airflows in each branch and the values of the temperature, water-vapor density and $CO_2$ concentration in the train, branch, station and tunnel to thereby output the data as a graph or form of calculation results obtained from the fourth processing portion 4.

Referring next to the flow chart of FIGS. 5 and 6, the operation of the fourth processing portion will be described below.

(1) First, the name of the airflow analysis result data file obtained from the first processing portion 1, the name of the thermal analysis result data file obtained from the second processing portion 2, the name of the analysis result data file obtained from the third processing portion 3, the name of the structure model data inside file, the information as to whether the outside-air data inside file is to be used or not, the name of the outside-air data inside file, the information as to whether the station getting-on-and-off passenger data inside file is to be used or not, the name of the station getting-on-and-off passenger data inside file, the information as to whether the inter-station passenger data inside file is to be used or not, the name of the inter-station passenger data inside file, the information as to whether continuation initial data are to be used or not, and the information as to whether result data are to be printed out or not, are read from the execution condition data file not shown (step 501).

(2) The airflow analysis result data inside file obtained from the first processing portion 1, the thermal analysis result data inside file obtained from the second processing portion 2 and the analysis result data inside file obtained from the third processing portion 3 are read and the respective data are stored as inside variables. Further, the structure model data inside file, the train diagram data inside file, the station getting-on-and-off passenger data inside file and the inter-station passenger data file are read, and the respective data are stored as inside variables. Further, the schedule operating data file for the air supply fan, air exhaust fan, air-conditioner set in the station, etc. are read so that schedule operating data are generated (steps 502 to 509).

(3) Then, the constant data file is read and the respective data are stored as inside variables (step 510).

(4) The structure construction data given from the subway structure construction processing portion described above but not shown are stored. Further, a matrix of the airflow ratio coefficients given from the subway structure construction processing portion is set to be used for solving simultaneous linear equations for calculation of pressure (steps 511 and 512).

(5) Standard values are set to the values of the airflow velocity, temperature, water-vapor density and $CO_2$ concentration concerning each branch, the values of the temperature and water-vapor density concerning the train, and the values of the temperature concerning the station and tunnel. The continuation initial data file is read and the values of the airflow velocity, temperature, water-vapor density and $CO_2$ concentration concerning each branch, the values of the temperature and water-vapor density values concerning the train, and the values of the temperature concerning the station and tunnel are set (steps 513 and 514).

(6) The data file input and initialization are completed by the aforementioned steps. Then, the train registration, the train information setting and the branch information setting are performed at predetermined intervals of time (1 sec.). These data are data obtained from the train operation management portion not shown. On the basis of these data, the information as to whether an operated train appears in the railway system or whether the train is before of after appearance is registered at intervals of 1 sec., so that a route index concerning the operated train, the distance from a reference position, the velocity of the train, the acceleration of the train and the quantities of heat generated in the train and railway plates are set as the train information, and that the number of a branch where the train exists is set as the branch information (steps 516 to 518).

(7) Then, the pressure at each connection point in the railway system and the data concerning the train passing through the connection point are set as boundary data, and the temperature and water-vapor density of the outside air, the number of passengers getting on and off in each station, the number of passengers existing in the train running between stations and the heat conductivity values of branch wall surfaces, chamber wall surfaces, train surfaces and railway plate surfaces are set (steps 519 to 522).

(8) Then, the ON/OFF data for the air supply fan, air exhaust fan, air-conditioner, etc. are set as data dependent on one-day's business hours and as data dependent on the seasons in one year, respectively; and the ratio of air quantity and the ratio of heat exchange are set as correction data for the air-conditioner (steps 523 to 526).

(9) Using the respective data set by the aforementioned steps, the differential coefficient calculation and the airflow and thermal integration in respective stages are performed while integration is controlled by the Runge-Kutta method to thereby calculate the differential coefficients of the velocity of airflows caused by a moving train in each train side region in a branch in which the moving train exists, calculate the train pressure difference in each train side region in the branch in which the moving train exists, and calculate the differential coefficients of the airflow ratio in the tunnel/platform branch, general branch, air supply fan branch, air exhaust .fan branch and air-conditioner branch (steps 527 to 530).

(10) Then, the coefficients of the airflow ratio are calculated so that the pressure at each point is calculated by an active column method using simultaneous linear equations (step 531).

(11) On the basis of the pressure as calculation results in the step 531, the differential coefficients of the airflow ratio in respective branches, the differential coefficients of the airflow temperature and water vapor density in the existing train in the railway system, the differential coefficients of train temperature, the differential coefficients of temperature of railway plates striking on the lower portion of the existing train in the railway system, the differential coefficients of temperature of railway plates not striking on the train, the differential coefficients of the airflow temperature and water vapor density in the side region of the existing train in the railway system, the differential coefficients of the airflow temperature, water vapor density and $CO_2$ concentration in the tunnel and platform branch portions where no train runs, the differential coefficients of the airflow temperature, water vapor density and $CO_2$ concentration in the general branch, the differential coefficients of the airflow temperature, water vapor density and $CO_2$ concentration in the air supply fan and air exhaust fan branches, the differential coefficients of the airflow temperature, the water vapor density and $CO_2$ concentration in the air-conditioner branch, the differential coefficients of the airflow temperature, water vapor density and $CO_2$ concentration in chambers and the differential coefficients of wall temperature and field temperature in the station and tunnel branches are obtained (step 532).

(12) Simple statistical analysis is performed so that the plus-side and minus-side averages of the airflow temperature, water-vapor density and $CO_2$ concentration in each branch on one day in each season are obtained by averaging calculation, and that the minimum and maximum values of the airflow temperature, water-vapor density and $CO_2$ concentration in each branch on one day in each season and the time of appearance thereof are obtained. Further, calculation concerning heat balance is performed (steps 533 and 534).

(13) Finally, a continuation initial data file and an analysis result data file are outputted as output data files (step 535).

In the aforementioned air-conditioning and ventilation simulator according to the present invention, the airflow velocity and pressure values in the respective branches such as a tunnel branch and a station branch in the whole railway route on one day can be predicted by giving, as input data, data such as conditions concerning the structure, heat conduction and heat generation in the respective branches in the tunnel and station, equipmental data and time-series operating conditions of air-conditioning equipment and ventilation equipment, conditions concerning the structure, heat conduction, movement and time-series heat generation of trains, time-series operating conditions of a plurality of trains in each branch in the tunnel and station, time-series temperature and humidity conditions of the outside air, the quality of the field under the ground, the water flow velocity of subsurface water, etc.

Furthermore, the temperature and humidity values in each branch in the tunnel and station in the whole railway route in one year can be predicted on the basis of the analysis results of the airflow velocity in each branch in the tunnel and station in the whole railway route on one day. Furthermore, the thermal storage in the station structure and under the ground for 20 years can be predicted on the basis of the analysis results of the airflow velocity in each branch in the tunnel and station in the whole railway route on one day and the analysis results of the temperature and humidity in each branch in the tunnel and station in the whole railway route in one year.

Furthermore, when the conditions concerning the structure, heat conduction and heat generation of each branch in the station and the equipmental data of air-conditioning equipment and ventilation equipment are finely fragmentated so as to be equivalent to the aforementioned analysis results so that the analysis results on the analysis object day thus set are used as input conditions, the values of the airflow velocity, pressure, temperature, humidity and $CO_2$ concentration in each branch in the station in one day can be predicted. Furthermore, when the quantity of fine dusts, the size of fine dusts, etc. brought by passengers getting on and off the train are estimated on the basis of the airflow velocity, the fine-dust concentration can be predicted.

Although the aforementioned embodiment of the present invention has been described about the case where the present invention is applied to the subway system, the invention can be applied to environment simulation in a subsurface space such as a subsurface shopping center, or the like, or in an extremely closed space.

As described above, according to the present invention, the values of the airflow velocity, pressure, temperature, humidity, $CO_2$ concentration and fine-dust concentration in the tunnel and in respective branches constituting a station structure in a subsurface space, particularly in a subway, can be predicted with high accuracy. By using the present invention, not only a guideline for planning of tunnel and station structures to suppress the airflows caused by the moving trains can be obtained but also the scale of equipment such as air-conditioning equipment, ventilation equipment, etc. can be set appropriately on the basis of the predicted results of heat load, $CO_2$ concentration and fine-dust concentration.

What is claimed is:

1. An air-conditioning and ventilation simulator for predicting environmental conditions in a subsurface space, comprising:
   a first processing portion for obtaining the airflow velocity in branches including a tunnel, stairs, passages, vents, etc. constituting the subsurface space by using, as input data, subsurface space structure model data concerning said branches and movement data of a moving body which makes air move in said subsurface space;

a second processing portion for calculating initial values and short-term change values of wall temperature and field temperature in each of said branches, initial values and boundary values of temperature, water-vapor density and carbon dioxide concentration in each of said branches, by using, as input data, said space structure model data, analysis result data obtained from said first processing portion, data concerning thermal characteristic of said moving body, data of outside-air temperature, outside-air humidity and outside-air carbon dioxide concentration, and data of passengers which go in and out of said space;

a third processing portion for calculating wall temperature, field temperature and airflow temperature in each of said branches, by using, as input data, said space structure model data, airflow analysis result data obtained from said first processing portion and thermal analysis result data obtained from said second processing portion; and a fourth processing portion for performing detailed calculation of airflow velocity, temperature, humidity and carbon dioxide concentration for calculating time-varying data of airflow temperature, water-vapor density and carbon dioxide concentration in each of said branches by using, as input data, said space structure model data, said airflow analysis result data obtained from said first processing portion, said thermal analysis result data obtained from said second processing portion, and wall and field temperature data obtained from said third processing portion.

2. An air-conditioning and ventilation simulator in a subsurface space according to claim 1, wherein said first processing portion outputs airflow velocity in each of said branches as one-day's time-varying information.

3. An air-conditioning and ventilation simulator in a subsurface space according to claim 2, wherein said second processing portion outputs airflow temperature, airflow humidity, wall temperature and field temperature in each of said branches as time-varying information in accordance with passage of seasons in one year.

4. An air-conditioning and ventilation simulator in a subsurface space according to claim 2, wherein said third processing portion outputs wall temperature and field temperature in each of said branches as time-varying information in 20 years.

5. An air-conditioning and ventilation simulator in a subsurface space according to claim 2, wherein said subsurface space is a subsurface space constituting a subway; said subsurface space structure model data is a station structure model data; and said moving body is a vehicle which runs in a tunnel.

6. An air-conditioning and ventilation simulator in a subsurface space according to claim 1, wherein said second processing portion outputs airflow temperature, airflow humidity, wall temperature and field temperature in each of said branches as time-varying information in accordance with passage of seasons in one year.

7. An air-conditioning and ventilation simulator in a subsurface space according to claim 6, wherein said third processing portion outputs wall temperature and field temperature in each of said branches as time-varying information in 20 years.

8. An air-conditioning and ventilation simulator in a subsurface space according to claim 6, wherein said subsurface space is a subsurface space constituting a subway; said subsurface space structure model data is a station structure model data; and said moving body is a vehicle which runs in a tunnel.

9. An air-conditioning and ventilation simulator in a subsurface space according to claim 1, wherein said third processing portion outputs wall temperature and field temperature in each of said branches as time-varying information in 20 years.

10. An air-conditioning and ventilation simulator in a subsurface space according to claim 9, wherein said subsurface space is a subsurface space constituting a subway; said subsurface space structure model data is a station structure model data; and said moving body is a vehicle which runs in a tunnel.

11. An air-conditioning and ventilation simulator in a subsurface space according to claim 1, wherein: said subsurface space is a subsurface space constituting a subway; said subsurface space structure model data is a station structure model data; and said moving body is a vehicle which runs in a tunnel.

* * * * *